3,007,926
NEW CAMPHOR DERIVATIVES AND THE
METHOD OF PREPARING THEM
Michio Nakanishi, 1421 3-Chome, Tonomachi,
Nakatsu-shi, Ooita, Japan
No Drawing. Filed Sept. 12, 1958, Ser. No. 760,567
Claims priority, application Japan Sept. 18, 1957
1 Claim. (Cl. 260—247.2)

The present invention relates to new camphor derivatives and to a process for preparing the same.

More particularly the invention relates to the new compound of the general formula

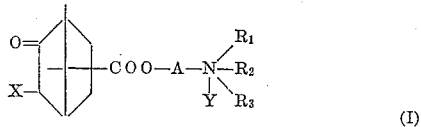

(I)

wherein X is selected from the group consisting of halogen atoms, hydroxyl radical and hydrogen atom; A is selected from the alkylene groups with 2–5 carbon atoms; $R_1$, and $R_2$ are each selected from the group consisting of hydrogen atom, lower alkyl radicals and, by the two, bivalent groups forming rings with the nitrogen atom present in the Formula (I); $R_3$ is selected from the group consisting of alkyl radicals and aralkyl radicals; Y is selected from the group consisting of halogen atoms, arylsulfonyloxy groups and alkylsulfate groups;

The lower alkyl radicals, which are designated by $R_1$ and $R_2$ in the general Formula (I) mentioned above, indicate the radicals such as, for example, methyl, ethyl, propyl and so forth, and the ring with two-valencies in which nitrogen atom is involved corresponds to such radicals as, for instance, piperidino, morpholino, piperazino, pyrrolidino etc.

The camphor derivative of the general Formula (I) can be produced from the camphor derivative of the general formula

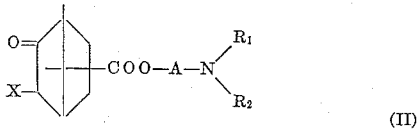

(II)

wherein each of X, A, $R_1$ and $R_2$ is the same as that mentioned above;

by reaction with a compound of the general formula $R_3Y$ wherein each of $R_3$ and Y is the same as that mentioned above.

The reaction may be conducted preferably in organic solvents such as benzene, toluene, and alcohol, which are inert with respect to the reactions. The reaction generally takes place even at room temperature, but more effectively under heating.

Supremacy of this chemical compound obtainable by the method under this invention in efficiency of reducing blood pressure, though being novel chemical compound unrevealed yet in any literature, can be recognized from the hereunder mentioned examination.

By the use of N-methyl-N-(2-isoketopinoyl-oxyethyl)-morpholinium iodide to be obtained by Example 4 as sample medicine as hereunder mentioned, the following result can be given by such experimental method as stated later.

By giving 0.1 mg./kg. of this chemical compound to an adult dog, hypotensive effect was already recognized and by 0.25 mg./kg., longlasting remarkable hypotensive effect was resulted. The ultimate lowering degree by giving 0.5 mg./kg. is approximately 50 mm. Hg, and duration thereof was about 20 minutes.

In the above experiment a pentobarbital anesthetized dog (approximately 10 kg. weight) was used for experimental animal and blood pressure of carotid artery and coxa artery was recorded with the aid of mercury manometer, and the test compound was injected into vein of a leg of the dog under test.

The camphor derivatives shown above, which are employed as raw material in the preparation of this invention, have a general formula,

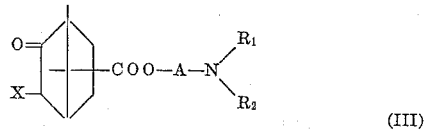

(III)

where each of X, A, $R_1$ and $R_2$ is similar as previously employed. This is also a new material and can be prepared from the reaction between camphor derivatives, of which general formula is

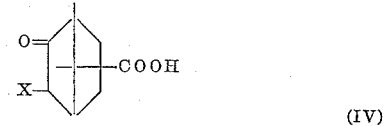

(IV)

wherein X is the same as that mentioned above;
or their reactive carbonic acid derivatives (such as, for example, alkali or alkali earth metal salts of carbonic acid, or carbonic acid halogenides of chlorine or bromine, or carbonic acid alkyl or aryl esters) and aminoalkanole, of which general formula is

(V)

wherein each of $R_1$ and $R_2$ is the same as mentioned above; or its reactive derivatives (such as, for example, its halogenides or esters such as sulfuric acid ester or organic sulfonic acid ester).

Many combinations are possible for the reaction between the camphor derivatives (IV) (or its reactive carbonic acid derivatives) and aminoalkanole (V) (or its reactive derivatives), and in each case its reaction conditions, such as decarboxyl agent, condensation agent, reaction solvent, or reaction temperature, can suitably be employed referring to the experimental conditions in the general esterification reaction.

The method of the present invention is explained by example as follows:

*Example 1*

To a solution of 14 g. of 2-diethylaminoethyl isoketopinate (II, X=H, A=—$CH_2CH_2$—, $R_1$=$R_2$=$C_2H_5$) in 100 cc. of benzene 8 g. of ethyl iodide ($R_3$=$C_2H_5$, Y=I) is added and the mixture is heated for 10 hours. The precipitated crystalline substance is collected by filtration and recrystallized from a mixture of acetone and ethyl acetate to give triethyl-(2-isoketopinoyloxyethyl)-ammonium iodide (I, X=H, A=—CH$_2$CH$_2$—, R$_1$=R$_2$=R$_3$ =C$_2$H$_5$, Y=I) melting at 152° C.

*Example 2*

To a solution of 10 g. of 2-dimethylaminoethyl isoketopinate (II, X=H, A=—CH$_2$CH$_2$—, R$_1$=R$_2$=CH$_3$) in 100 cc. of benzene 6 g. of methyl iodide (R$_3$=CH$_3$, Y=I) is added with cooling. The mixture is heated for 5 hours. The reaction gives trimethyl-(2-isoketopinoyloxyethyl)ammonium iodide (I, X=H, A=—CH$_2$CH$_2$—, R$_1$=R$_2$=R$_3$=CH$_3$, Y=I) melting at 208° C.

*Example 3*

Fifteen grams of 3-dimethylaminopropyl isoketopinate (II, X=H, A=—CH$_2$CH$_2$CH$_2$—, R$_1$=R$_2$=CH$_3$) and 8 g. of methyl iodide (R$_3$=CH$_3$, Y=I) in 100 cc. of benzene, treated as Example 2, give trimethyl-(3-isoketopinoyloxypropyl)ammonium iodide (I, X=H,

A=—CH$_2$CH$_2$CH$_2$—

R$_1$=R$_2$=R$_3$=CH$_3$, Y=I) melting at 181° C.

*Example 4*

Ten grams of 2-morpholinoethyl isoketopinate (II, X=H, A=—CH$_2$CH$_2$—, R$_1$R$_2$=CH$_2$CH$_2$OCH$_2$CH$_2$—) and 5 g. of methyl iodide (R$_3$=CH$_3$, Y=I) in 100 cc. of benzene, treated as Example 2, give N-methyl-N-(2-isoketopinoyloxyethyl)morpholinium iodide (I, X=H,

A=—CH$_2$CH$_2$—, R$_1$R$_2$=CH$_2$CH$_2$OCH$_2$CH$_2$—

R$_3$=CH$_3$, Y=I) melting at 231° C.

*Example 5*

Twenty-three grams of 2-piperidinoethyl isoketopinate (II, X=H, A=CH$_2$CH$_2$—,

R$_1$R$_2$=CH$_2$CH$_2$CH$_2$CH$_2$CH$_2$—)

and 11.5 g. of methyl iodide (R$_3$=CH$_3$, Y=I) in 100 cc. of benzene, treated as Example 1, give N-methyl-N-(2-isoketopinoyloxyethyl)piperidinium iodide (I, X=A,

A=—CH$_2$CH$_2$—, R$_1$R$_2$=—CH$_2$CH$_2$CH$_2$CH$_2$CH$_2$—

R$_3$=CH$_3$, Y=I) melting at 208° C.

*Example 6*

Five grams of 3-morpholinopropyl isoketopinate (II, X=H, A=—CH$_2$CH$_2$CH$_2$—,

R$_1$R$_2$=—CH$_2$CH$_2$OCH$_2$CH$_2$—)

and 2.3 g. of methyl iodide (R$_3$=CH$_3$, Y=I) in 50 cc. of benzene, treated as Example 1, give N-methyl-N-(3-isoketopinoyloxypropyl)morpholinium iodide (I, X=H,

A=—CH$_2$CH$_2$CH$_2$—, R$_1$R$_2$=—CH$_2$CH$_2$OCH$_2$CH$_2$—

R=CH$_3$, Y=I) melting at 205° C.

*Example 7*

Six grams of 3-piperidinopropyl isoketopinate (II, X=H, A=—CH$_2$CH$_2$CH$_2$—

R$_1$R$_2$=—CH$_2$CH$_2$CH$_2$CH$_2$CH$_2$—) and 2.8 g. of methyl iodide (R$_3$=CH$_3$, Y=I) in 50 cc. of benzene, treated as Example 1, give N-methyl-N-(3-isoketopinoyloxypropyl)-piperidinum iodide (I, X=H, A=—CH$_2$CH$_2$CH$_2$—, R$_1$R$_2$=—CH$_2$CH$_2$CH$_2$CH$_2$CH$_2$—, R$_3$=CH$_3$, Y=I) melting at 190° C.

*Example 8*

Thirteen grams of 2-morpholinoethyl isoketopinate (II, X=H, A=—CH$_2$CH$_2$—,

R$_1$R$_2$=—CH$_2$CH$_2$OCH$_2$CH$_2$—)

and 5.8 g. of propargyl bromide (R$_3$=CH≡CCH$_2$—, Y=Br) 50 cc. of benzene, treated as Example 1, give N-propargyl - N-(2-isoketopinoyloxyethyl)morpholinium bromide (I, X=H, A=—CH$_2$CH$_2$—,

R$_1$R$_2$=—CH$_2$CH$_2$OCH$_2$CH$_2$—

R$_3$=CH≡CCH$_2$—, Y=Br) melting at 105° C.

*Example 9*

Ten grams of 1-methyl-2-morpholinoethyl isoketopinate (II, X=H, A=(O)—CH(CH$_3$)CH$_2$—(N),

R$_1$R$_2$=—CH$_2$CH$_2$OCH$_2$CH$_2$—)

and 5 g. of methyl iodide (R$_3$=CH$_3$, Y=I) in 100 cc. of benzene, treated as Example 1, give N-methyl-N-(2-isoketopinoyloxyethyl)morpholinium iodide (I, X=H,

A=(O)—CH(CH$_3$)CH$_2$—(N)

R$_1$R$_2$=—CH$_2$CH$_2$OCH$_2$CH$_2$—, R$_3$=CH$_3$, Y=I) melting at 208° C.

*Example 10*

Five and a half grams of 2-morpholinoethyl-α-chloro-isoketopinate (II, X=Cl, A=—CH$_2$CH$_2$—,

R$_1$R$_2$=—CH$_2$CH$_2$OCH$_2$CH$_2$—)

and 2.8 g. of methyl iodide (R$_3$=CH$_3$, Y=I) in 50 cc. of benzene, treated as Example 1, give N-methyl-N-(2-α-chloroisoketopinoyloxyethyl)morpholinium iodide (I, X=Cl, A=—CH$_2$CH$_2$—,

R$_1$R$_2$=—CH$_2$CH$_2$OCH$_2$CH$_2$—

R$_3$=CH$_3$, Y=I) melting at 219° C.

*Example 11*

Nine grams of N,N' - bis - (2 - isoketopinoyloxyethyl)-piperazine (VI)

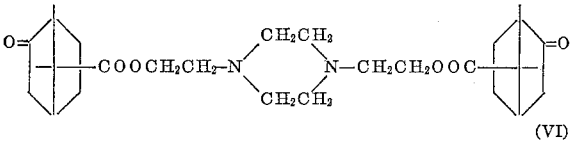

(VI)

and 3.1 g. of methyl iodide (R$_3$=CH$_3$, Y=I) in benzene, treated as Example 1, give N-methyl-N,N'-bis-(2-isoketopinoyloxyethyl)piperazinium iodide (VII) melting at 197° C.

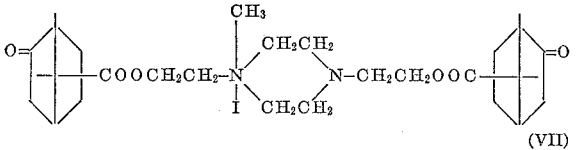

(VII)

*Example 12*

Nine grams N,N'-bis-(2-isoketopinoyloxyethyl)piperazine (VI) and 6 g. of methyl iodide (R$_3$=CH$_3$, Y=I) in 500 cc. of alcohol are heated under pressure on a waterbath for 15 hours. Bis-methiodide (VIII) melting at 220° C. is obtained.

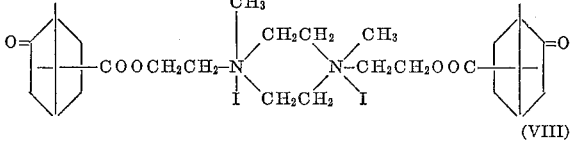

(VIII)

*Example 13*

Eleven grams of 4-morpholino-2-butynyl isoketopinate (II, X=H, A=—CH$_2$C≡CCH$_2$—,

R$_1$R$_2$=—CH$_2$CH$_2$OCH$_2$CH$_2$—)

and 10 g. of methyl iodide (R$_3$=CH$_3$, Y=I) in 100 cc. of benzene are heated for 7 hours. The oily product is dissolved in alcohol. The oil precipitated by adding ether to the alcoholic solution is dried to give N-methyl- N-(4-isoketopinoyloxy - 2 - butynyl)morpholinium iodide
(I, X=H, A=—CH$_2$C≡CCH$_2$—,

R$_3$=CH$_3$, Y=I) in extremely hygroscopic powder melting at 85° C.

*Example 14*

Eleven grams of 4-morpholinobutyl isoketopinate
(II, X=H, A=—CH$_2$CH$_2$CH$_2$CH$_2$—,

is treated in the same way as Example 13. N-methyl-N - (4 - isoketopinoyloxybutyl)morpholinium iodide (I, X=H, A=—CH$_2$CH$_2$CH$_2$CH$_2$—,

R$_3$=CH$_3$, Y=I) is obtained as an extremely hygroscopic substance melting at 65° C.

The preparation of some starting materials in this invention is described in the case of a few examples as follows:

(1) 40 g. of isoketopinic acid chloride and 27 g. of 2-oxyethyl-morpholin are heated in xylene. After cooling the solution, xylene layer is washed with aqueous solution of sodium carbonate and then extracted with dilute hydrochloric acid. Sodium hydroxide is added in the acid solution until it becomes a strong alkaline solution. Thus 2-morpholinoethyl isoketopinate can be obtained as oily layer which is separated from the solution. B.P. 203° C./3 mm. Hg.

(2) N,N'- bis-(2-isoketopinoyloxyethyl)piperazine can be prepared in a similar way by reacting 17 g. of N,N'-bis-(β-oxyethyl)-piperazine with 40 g. of isoketopinic acid chloride. M.P. 94° C.

What I claim is:

Camphor compounds of the formula

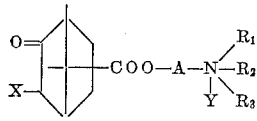

wherein X is selected from the group consisting of halogen, hydroxyl and hydrogen; A is alkylene of 2 to 5 carbon atoms; R$_1$ and R$_2$ are each selected from the group consisting of lower alkyl of 1 to 3 carbon atoms and groups forming together with the N-atom a member selected from the group consisting of piperidino, morpholino, piperazino and pyrrolidino; R$_3$ is selected from the group consisting of lower alkyl of 1 to 3 carbon atoms and propargyl, and Y is halogen.

References Cited in the file of this patent
UNITED STATES PATENTS
2,797,227    Jenkins _____ June 25, 1957